United States Patent [19]

Iwase

[11] Patent Number: 4,560,707

[45] Date of Patent: Dec. 24, 1985

[54] HEAT-RESISTANT PHENOLIC RESIN FOAM

[75] Inventor: Sumio Iwase, Mie, Japan

[73] Assignee: Mitsubushi Petrochemical Co., Ltd., Tokyo, Japan

[21] Appl. No.: 629,462

[22] Filed: Jul. 10, 1984

[30] Foreign Application Priority Data

Jul. 11, 1983 [JP] Japan .................................. 58-125685
Jul. 22, 1983 [JP] Japan .................................. 58-133933

[51] Int. Cl.$^4$ .............................................. C08J 9/14
[52] U.S. Cl. ...................................... 521/124; 521/92; 521/125; 521/181
[58] Field of Search ................... 521/181, 92, 124, 125

[56] References Cited

U.S. PATENT DOCUMENTS

| | | | |
|---|---|---|---|
| 3,298,973 | 1/1967 | Quarles et al. | 521/181 |
| 3,475,355 | 10/1969 | Decker | 521/181 |
| 3,813,356 | 5/1974 | Lievremont et al. | 521/181 |
| 3,951,885 | 4/1976 | Thompson | 521/181 |
| 4,122,045 | 10/1978 | Garrett et al. | 521/181 |
| 4,166,162 | 8/1979 | Weissenfels et al. | 521/181 |
| 4,419,460 | 12/1983 | Ho | 521/181 |
| 4,463,106 | 7/1984 | Rühl et al. | 521/181 |

*Primary Examiner*—Morton Foelak
*Attorney, Agent, or Firm*—Oblon, Fisher, Spivak, McClelland & Maier

[57] ABSTRACT

A heat-resistant phenolic resin foam containing a hydrate of an inorganic compound which generates a water vapor at a temperature below the decomposition temperature of the phenolic resin foam, wherein (a) the hydrate of the inorganic compound has a pH of not more than 8 as its saturated aqueous solution, and (b) the hydrate of the inorganic compound is contained in an amount of 2 to 30% by weight in the phenolic resin foam.

4 Claims, No Drawings

HEAT-RESISTANT PHENOLIC RESIN FOAM

FIELD OF THE INVENTION

This invention relates to a resole-type phenolic resin foam having excellent heat insulating property, fire resistance, friability resistance and mechanical strength. The phenolic resin foam is useful as a thermal insulating material for a wall panel of building, a substrate for furniture, a furnishing material and an industrial material.

BACKGROUND OF THE INVENTION

The excellent fire resistance of the phenolic resin foam is attributed to the following reason. When, for example, the external wall of a house which is made from the phenolic resin foam is exposed to a high temperature owing to a fire that has broken out in a neighboring house, the phenolic resin foam as a heat insulating material is gradually oxidized at a temperature of over 200° C. to form a semicrystalline porous matrix layer (char). The resulting char covers the surface of the substrate. This layer has the ability to inhibit combustion, and even when a large amount of oxygen is supplied to the surface of the char and the temperature of a foam becomes as high as more than 1,000° C., the attack of the fire against the substrate of the phenolic resin foam does not easily proceed. When the surface of the phenolic resin foam is carbonized, it first becomes amorphous carbon having an ignition point of up to 300° C. When it is exposed to higher temperatures, it is converted to a graphite crystal. The ignition point of graphite is 450° to 550° C. Thus, in the event of fire, the phenolic resin foam absorbs heat during exposure to high temperatures and becomes graphatized at its surface. This results in the formation of a graphite covering having a high ignition point, and prevents combustion from proceeding to the inside of the phenolic resin foam.

The phenolic resin foam is produced by uniformly stirring a composition composed of a liquid resole-type phenolic resin, a blowing agent (such as Freon, petroleum ether, butane, water, etc.), a cell stabilizer (such as a silicone oil and a surfactant (e.g., dodecyl benzene)), and an acid catalyst which is a curing agent (such as sulfuric acid, hydrochloric acid, phosphoric acid, benzenesulfonic acid, toluenesulfonic acid, phenolsulfonic acid, etc.), and as required, an inorganic filler, a pigment, etc., pouring the uniform mixture into a mold, and heating it at 25° to 70° C., preferably 40° to 65° C., to expand it.

The resole-type phenolic resin foam has better fire resistance and heat insulating property than urethane foam and polystyrene foam, but it is very fragile.

In an attempt to improve the friability resistance of such a phenolic resin foam, a method was proposed in which sodium metaborate tetrahydrate ($NaBO_2.4H_2O$) or borax ($Na_2B_4O_7.10H_2O$) is included in the phenolic resin foam and a ceramic layer is formed at a high temperature as disclosed in, for example, Japanese Patent Application (OPI) Nos. 57768/76 and 765/80 (the term "OPI" as used herein refers to a "published unexamined Japanese patent application"). Since these hydrates evolve a water vapor at a temperature below the decomposition temperature of the phenolic resin foam, the foam has high fire resistance.

However, since the liquid resole resin as a material for the phenolic resin foam contains about 10 to 20% of water attributed to the starting formalin, sodium metaborate tetrahydrate or borax is alkaline in the liquid resole resin (a saturated aqueous solution of the former has a pH of 11.8, and a saturated aqueous solution of the latter has a pH of 9.3). Accordingly, in the production of a resin foam by incorporating such an alkaline hydrate in a liquid resole resin together with a blowing agent, a foam regulating agent, a curing agent, etc., the curing reaction of the resole resin does not take place (namely, a foam cannot be obtained) unless the acidic curing agent is present in an amount more than which is sufficient to neutralize the alkaline hydrate. Consequently, a fairly large amount of the acidic curing agent must be used. Furthermore, large amounts of acidic ions (such as $SO_4^{--}$ and $Cl^-$) attributed to a salt formed between the hydrate and the curing agent remain, and accelerate corrosion of metallic building materials. Furthermore, since the curing agent such as sulfuric acid or hydrochloric acid is used as a dilution in water, the use of a large amount of the acidic curing agent inhibits the curing of the foamable ingredients because of the presence of a large amount of water, or may cause a deterioration in the mechanical properties of the resulting foam.

Specifically, 50% sulfuric acid (curing agent) is usually used in an amount of 5 to 20 g to cure 100 g of the resole resin. When 50 g of sodium metaborate is used per 100 g of the resole resin, the amount of 50% sulfuric acid required to neutralize sodium metaborate is about 34 g, as shown in the specification of Japanese Patent Application (OPI) No. 57768/76, and in addition to this amount, 5 to 20 g of 50% sulfuric acid is required as a curing agent.

The phenolic resin foam also have the defect of high thermal conductivity.

SUMMARY OF THE INVENTION

An object of this invention is to remove the defect of the technique described in the above-described Japanese Patent Application (OPI) No. 57768/76, and to provide a phenolic resin foam having excellent fire resistance and low friability which is obtained by using a hydrate of a neutral or weakly acidic inorganic compound instead of the strongly alkaline sodium metaborate thereby to reduce the amount of the acid curing agent used and inhibit the reduction of the mechanical strength of the resulting foam.

The above-described object is achieved in accordance with this invention by a heat-resistant phenolic resin foam containing a hydrate of an inorganic compound which generates a water vapor at a temperature below the decomposition temperature of the phenolic resin foam, wherein (a) the hydrate of the inorganic compound has a pH of not more than 8 as its saturated aqueous solution, and (b) the hydrate of the inorganic compound is contained in an amount of 2 to 30% by weight in the phenolic resin foam.

DETAILED DESCRIPTION OF THE INVENTION

In the present invention, the resole-type phenolic resin foam is produced by stirring a composition composed of a liquid resole-type phenolic resin, a blowing agent such as Freon or petroleum ether, a cell stabilizer such as a silicone oil or a surfactant, an acid catalyst as a curing agent such as sulfuric acid, phosphoric acid, hydrochloric acid, benzenesulfonic acid, toluenesulfonic acid or phenolsulfonic acid, a hydrate of an inorganic compound and as required, an inorganic filler, an organic filler, etc., pouring the resulting uniform mixture (phenolic foam forming ingredients) into a mold and heating it at 25° to 70° C., preferably 40° to 65° C. to expand it (see, for example, *Polymeric Mechanical Materials—Phenolic Resin Guidebook*, published on Oct. 1, 1967 by Kyoritsu Shuppan Co., Ltd., pages 135–138, JAPAN).

Preferably, the production of the phenolic resin foam is effected such that the proportion of closed cells in the phenolic resin foam becomes at least 75%.

Examples of the hydrate of the inorganic compound which has a pH of not more than 8.0 as its saturated aqueous solution are listed below. Of these, acidic hydrates of inorganic compounds having a pH of not more than 6 are preferred. The parenthesized figures below show pH values determined for saturated aqueous solutions.

Magnesium sulfate ($MgSO_4.1-7H_2O$) (5.1)
Sodium sulfate ($Na_2SO_4.4-10H_2O$) (5.8)
Aluminum sulfate [$Al_2(SO_4)_3.14-18H_2O$] (1.7)
Sodium alum [$NaAl(SO_4)_2.12H_2O$] (3.1)
Potassium alum [$KAl(SO_4)_2.12H_2O$] (4.6)
Zinc sulfate ($ZnSO_4.7H_2O$) (5.3)
Magnesium phosphate [$Mg_3(PO_4)_2.8H_2O$] (6.8)
Aluminum silicate ($Al_2.9SiO_2.13H_2O$) (7.6)

The above-exemplified hydrates show the moles of water of crystallization when they are in the most stable condition. An anhydrous inorganic compound may also be usable as a hydrate. When it is added to the resole ingredient, it absorbs water from the obtained resole resin and becomes a hydrate in the final phenolic resin foam. Hence, the phenolic resin foam may be produced by adding such an inorganic compound in an anhydrous form to the resole resin together with water.

The use of $KAl(SO_4)_2.12H_2O$ (dissolution temperature 92.5° C.) or $Al_2(SO_4)_3.14-18H_2O$ (dissolution temperature 100° C.) which dissolves by its own water of crystallization at a temperature of at least 80° C. brings about the advantage that a phenolic resin foam having low thermal conductivity can be obtained.

To produce a phenolic resin foam having low thermal conductivity, it is desirable to provide as high a proportion of closed cells as possible, reduce the size of the cells and confine a gas (blowing agent) having low thermal conductivity in the cells. With the prior art, however, it is very difficult to provide a phenolic resin foam having both a high proportion of closed cells and high fire resistance. When a foam having a high proportion of closed cells is burned, the gas confined within the cells expands as the temperature rises. As a result, the cells can no longer withstand the internal pressure and bursts open and scatters (the so-called pomping). Thus, the solid covering of graphite having a high ignition point on the surface of the resulting foam scatters and the non-graphatized surface is newly exposed. Thus, the combustion successively proceeds in the thickness direction (the direction of the substrate) and impairs the fire resistance of the phenolic resin foam. The phenolic resin foam therefore has very inferior fire resistance.

In contrast, the phenolic resin foam of the invention containing the above-specified hydrate of inorganic compound is free from such pomping and has excellent fire resistance.

When the phenolic resin foam is exposed to heat during burning, the water of crystallization is liberated and evaporated from the hydrate of inorganic compound. At this time, the hydrate deprives the heat of vaporization and inhibits combustion and increases fire resistance. When the phenolic resin foam is closed-cellular, the hydrate of inorganic compound is present in thin walls separating the cells from one another and increases the strength (fracture resistance) of the foam. When as a result of burning of the foam, a temperature of foam reaches to a temperature at which the hydrate dissolves in its own water of crystallization, its phase changes from solid to liquid and easily makes holes in the cellular walls. As a result, the cells are interconnected to become one cell. This action takes place in the individual cells, and the closed cells are converted to open cells. Accordingly, even when the temperature further rises, the destruction of the cells owing to the expansion of the gas within the cells does not take place. As a result, the bursting and scattering of graphite does not occur, and the fire resistance inherently possessed by the phenolic resin foam can be retained.

The concentration of the hydrate of inorganic compound in the phenolic resin foam which is necessary for the exhibition of the aforesaid function is 2 to 30% by weight.

If it is less than 2% by weight, closed cells of the resulting resin foam cannot be completely converted to open cells during fire-heating, and consequently, the bursting and scattering of graphite during burning cannot be prevented.

If it exceeds 30% by weight, the viscosity of the starting resole-type phenolic resin increases extremely, and the mixing of the acid curing agent becomes difficult. Moreover, the phenolic resin foam finally produced has a high density and becomes brittle.

The method of producing the phenolic resin foam of this invention is described in more detail below.

The liquid resole-type phenolic resin initial condensate ("resole resin" hereinafter) as a main material can be obtained by reacting a monohydric phenol such as phenol, cresol and xylenol with formaldehyde in the presence of an alkaline catalyst such as barium hydroxide, neutralizing the resulting condensation product with an acid such as sulfuric acid (pH 7–8), dehydrating the product under reduced pressure to give the final product as a liquid having a water content of 10 to 20% and a viscosity at 25° C. of 5 to 35 poises. To the resulting liquid resole resin is added 1 to 5 parts by weight of a cell regulating agent suitable for production of closed cells. Thus, a system liquid is obtained.

The hydrate or anhydrous form of the inorganic compound is added in a required amount as a finely pulverized form or an aqueous solution to the system liquid, and they are fully mixed. Furthermore, a blowing agent (preferably Freon) is mixed with the system liquid. The sequence of adding the hydrate or anhydrous form of the inorganic compound and the blowing agent may be reversed. The curing catalyst is added to the resulting mixture, and the mixture is poured into a given mold. The mold is then placed in a heater adjusted to a temperature of 40° to 80° C. to expand and cure the resin and to obtain the desired foam.

Foaming is not restricted to the use of a mold, and may be continuously effected by using a double conveyor or the like.

The following examples illustrate the present invention more specifically.

EXAMPLE 1

| | |
|---|---|
| Liquid resole resin (phenol/formaldehyde concendensate; MY-106, a trade name for a product of Meiwa Chemical Co., Ltd. | 100 parts by weight |
| Cell regulating agent (silicone oil) | 2 parts by weight |
| MgSO$_4$.4H$_2$O | 6 parts by weight |
| Freon (R-113) | 15 parts by weight |
| 50% Sulfuric acid | 5 parts by weight |

A mixture of the above ingredients (system liquid) was poured in an iron mold having a cavity with a length of 300 mm and a width of 300 mm, and heated at 60° C. for 1 hour. The mold was cooled to a room temperature and then a foamed article having a thickness of 250 mm was taken off from the mold. After it was allowed to stand at room temperature for 1 week, its properties were measured. The results were as follows.

| | |
|---|---|
| MgSO$_4$.4H$_2$O content: | 5% by weight |
| Density: | 42 kg/m$^3$ |
| Proportion of closed cells: | 90% (measured by an air pycnometer method in accordance with ASTM D-2856) |
| Compressive strength (ASTM D-1621): | 2.4 kg/cm$^3$ |
| Friability (ASTM C-421): | 18% |
| JIS A-1321 surface test | |
| Temperature time area: | 80° C. min. |
| Fuming coefficient: | 8 |
| Breakage and cracking: | None |
| Evaluation (fire retardancy class 2): | Acceptable |

EXAMPLES 2 TO 7 AND COMPARATIVE EXAMPLES 1 TO 6

Phenolic resin foam articles were produced in the same manner as in Example 1 except that the hydrates of inorganic compounds shown in Table 1 in the indicated amounts were respectively used instead of 12 parts of magnesium sulfate tetrahydrate.

The properties of the resulting phenolic resin forms are also shown in Table 1.

TABLE 1

| | Comparative Example 1 | Comparative Example 2 | Example 1 | Example 2 | Comparative Example 3 | Comparative Example 4 | Comparative Example 5 |
|---|---|---|---|---|---|---|---|
| Composition (parts by weight) | | | | | | | |
| Resole "MY-106" | 100 | 100 | 100 | 100 | 100 | 100 | 100 |
| Silicone oil | 2 | 2 | 2 | 2 | 2 | 2 | 2 |
| Freon R-113 | 15 | 15 | 15 | 15 | 15 | 15 | 15 |
| 50% Sulfuric acid | 10 | 10 | 10 | 10 | 10 | 10 | 35 |
| Inorganic compound | | | | | | | |
| Type | — | MgSO$_4$.4H$_2$O | MgSO$_4$.4H$_2$O | MgSO$_4$.4H$_2$O | MgSO$_4$.4H$_2$O | NaBO$_2$.4H$_2$O | NaBO$_2$.4H$_2$O |
| Amount | — | 2.0 | 6.0 | 12 | 60 | 55 | 35 |
| Properties of Foam | | | | | | | |
| Content of the inorganic compound (%) | 0 | 1.5 | 5 | 10 | 32 | 30 | 30 |
| Density (kg/M$^3$) | 40 | 40 | 42 | 47 | ↑ | ↑ | 50 |
| Compressive strength (kg/m$^3$) | 1.8 | 1.8 | 2.4 | 3.0 | ↑ | ↑ | 1.5 |
| Friability (%) | 25 | 24 | 18 | 13 | ↑ | ↑ | 30 |
| JIS A-1321 Test | | | | | | | |
| Temperature time area (°C. min.) | 180 | 150 | 80 | 40 | A | B | 95 |
| Fuming coefficient | 10 | 10 | 8 | 7 | ↓ | ↓ | 12 |
| Breaking and cracking | Occurred | Occurred slightly | None | None | ↓ | ↓ | None |
| Evaluation (fire retardancy class) | Rejected | Rejected | Acceptable | Acceptable | ↓ | ↓ | Acceptable |

| | Comparative Example 6 | Example 3 | Example 4 | Example 5 | Example 6 | Example 7 |
|---|---|---|---|---|---|---|
| Composition (parts by weight) | | | | | | |
| Resole "MY-106" | 100 | 100 | 100 | 100 | 100 | 100 |
| Silicone oil | 2 | 2 | 2 | 2 | 2 | 2 |
| Freon R-113 | 15 | 15 | 15 | 15 | 15 | 15 |
| 50% Sulfuric acid | 46 | 10 | 10 | 10 | 10 | 10 |
| Inorganic compound | | | | | | |
| Type | NaBO$_2$.4H$_2$O | Na$_2$SO$_4$.10H$_2$O | ZnSO$_4$.7H$_2$O | NaAl(SO$_4$)$_2$.12H$_2$O | Mg$_3$(PO$_4$)$_2$.8H$_2$O | Al$_2$.9SiO$_2$.13H$_2$O |
| Amount | 60 | 12 | 12 | 12 | 12 | 12 |
| Properties of Foam | | | | | | |
| Content of the inorganic compound (%) | 50 | 10 | 10 | 10.5 | 9.8 | 10.2 |
| Density (kg/m$^3$) | ↑ | 43 | 41 | 40 | 39 | 41 |
| Compressive strength (kg/m$^3$) | ↑ | 2.2 | 2.3 | 2.1 | 2.2 | 2.4 |
| Friability (%) | ↑ | 16 | 17 | 17 | 17 | 15 |
| JIS A-1321 Test | | | | | | |
| Temperature time area (°C. min.) | A | 70 | 72 | 75 | 68 | 70 |
| Fuming coefficient | ↓ | 8 | 7 | 7 | 7.2 | 6.8 |
| Breaking and cracking | ↓ | None | None | None | None | None |

TABLE 1-continued

| | | | | | |
|---|---|---|---|---|---|
| Evaluation (fire retardancy class 2) | ↓ | Acceptable | Acceptable | Acceptable | Acceptable | Acceptable |

A: Poor flowability; dispersion of the curing agent was impossible.
B: Did not cure.

EXAMPLES 9 TO 11 AND COMPARATIVE EXAMPLES 7 TO 11

Resole-type phenolic resin foams were prepared in the same way as in Example 8 except that each of the mixtures indicated in Table 2 were used. The properties of the foams are also shown in Table 2.

TABLE 2

| | Examples | | | Comparative Examples | | | | |
|---|---|---|---|---|---|---|---|---|
| | 9 | 10 | 11 | 7 | 8 | 9 | 10 | 11 |
| Composition (parts by weight) | | | | | | | | |
| Liquid resole resin | 100 | 100 | 100 | 100 | 100 | 100 | 100 | 100 |
| Silicone oil | 2 | 2 | 2 | 2 | 2 | 2 | 2 | 2 |
| $Al_2(SO_4)_2$ $18H_2O$ | 10 | 20 | — | — | 35 | 10 | — | — |
| $KAl(SO_4)_2$ $12H_2O$ | — | — | 7 | 2 | — | — | — | — |
| $NaBO_4$ $4H_2O$ | — | — | — | — | — | — | 35 | 35 |
| Water | — | 5 | — | — | 10 | 10 | — | — |
| Freon R-113 | 15 | 15 | 15 | 15 | 15 | 15 | 15 | 15 |
| 50% sulfuric acid | 8 | 8 | 8 | 10 | 8 | 8 | 35 | 10 |
| Properties of Form | | | | | | | | |
| Density ($kg/m^3$) | 37 | 42 | 37 | 40 | ↑ | 38 | 50 | ↑ |
| Content of inorganic salt containing crystal water (%) | 8 | 17 | 5 | 1.5 | ↑ | 8 | 30 | ↑ |
| Proportion of closed cells (%) | 85 | 88 | 86 | 87 | ↑ | 60 | 80 | ↑ |
| Combustion test (fire retardancy class 2) | Acceptable | Acceptable | Acceptable | Rejected | ↑ | Acceptable | Acceptable | ↑ |
| (breakage, cracking) | (None) | (None) | (None) | (Some) | C | (None) | (None) | D |
| Compressive strength ($kg/cm^2$) | 2.6 | 2.7 | 2.3 | 1.9 | ↓ | 2.5 | 1.5 | ↓ |
| Thermal conductivity (Kcal/m · hr · °C.) | | | | | | | | |
| at 20° C. | 0.019 | 0.020 | 0.018 | 0.018 | ↓ | 0.032 | 0.020 | ↓ |
| at 80° C. | 0.027 | 0.028 | 0.026 | 0.026 | ↓ | 0.040 | 0.040 | ↓ |

Notes:
C: Molding impossible because of poor flowability.
D: Resin did not cure.

EXAMPLE 8

| | |
|---|---|
| Liquid resole resin (phenol/formaldehyde cocondensate; MY-106, a trade name for a product of Meiwa Chemical Co., Ltd. | 100 parts by weight |
| Cell regulating agent (silicone oil) | 2 parts by weight |
| $Al_2(SO_4)_3.18H_2O$ | 12 parts by weight |
| Freon (R-113) | 15 parts by weight |
| 50% Sulfuric acid | 5 parts by weight |

A mixture of the above ingredients was poured in an iron mold having a cavity with a length of 300 mm and a width of 300 mm, and heated at 60° C. for 1 hour. The mold was cooled to a room temperature and then a foamed article having a thickness of 250 mm was taken off from the mold. After it was allowed to stand at room temperature for 1 week, its properties were measured. The results were as follows.

| | |
|---|---|
| $Al_2(SO_4)_3.18H_2O$ content: | 9.5% by weight |
| Density: | 40 $kg/m^3$ |
| Proportion of closed cells: | 90% (measured by an air pycnometer method in accordance with ASTM D-2856) |
| Combustion test: (JIS A-1321 surface test): | Acceptable in fire retardancy class 2 (no breakage nor cracking) |
| Compressive strength (ADTM D-1621): | 2.6 $kg/cm^2$ |

While the invention has been described in detail and with reference to specific embodiments thereof, it will be apparent to one skilled in the art that various changes and modifications can be made therein without departing from the spirit and scope thereof.

What is claimed is:

1. A heat-resistant phenolic resole resin foam containing a hydrate of an inorganic compound which generates a water vapor at a temperature below the decomposition temperature of the phenolic resin foam, wherein
    (a) the hydrate of the inorganic compound has a pH of not more than 6 as its saturated aqueous solution and is selected from the group consisting of $MgSO_4.4H_2O$, $Na_2SO_4.10H_2O$, $ZnSO_4.7H_2O$, $NaAl(SO_4)_2.12H_2O$, $KAl(SO_4)_2.12H_2O_2O$ and $Al_2(SO_4)_3.14-18H_2O$, and
    (b) the hydrate of the inorganic compound is contained in an amount of 2 to 30% by weight in the phenolic resin foam.

2. The phenolic resin foam of claim 1, wherein the phenolic resin foam is a resole-type phenolic resin foam produced from a liquid resole-type phenolic resin, a blowing agent, an acidic curing agent, a cell regulating agent, and an inorganic compound and water or a hydrate of the inorganic compound.

3. The phenolic resin foam of claim 1, wherein the hydrate of the inorganic compound dissolves by its own water of crystallization at a temperature of at least 80° C.

4. The phenolic resin foam of claim 1, wherein the proportion of closed cells is at least 75%.

* * * * *